United States Patent [19]

Raquet et al.

[11] 4,353,586

[45] Oct. 12, 1982

[54] VIBRATION DAMPED RAILWAY WHEEL

[75] Inventors: Erwin Raquet, Witten; Richard Klatt, Bochum, both of Fed. Rep. of Germany

[73] Assignee: Fried. Krupp Huttenwerke AG, Bochum, Fed. Rep. of Germany

[21] Appl. No.: 903,013

[22] Filed: May 4, 1978

[30] Foreign Application Priority Data

| May 6, 1977 | [DE] | Fed. Rep. of Germany | 2720333 |
| Jun. 3, 1977 | [DE] | Fed. Rep. of Germany | 2725177 |
| Nov. 12, 1977 | [DE] | Fed. Rep. of Germany | 2750743 |
| Mar. 11, 1978 | [DE] | Fed. Rep. of Germany | 2810568 |

[51] Int. Cl.$^3$ .................. B60B 17/00; B60B 19/00; F16F 15/10; F16H 55/14
[52] U.S. Cl. .................................. 295/7; 74/574; 105/452; 181/209; 188/268; 188/379; 192/30 V; 238/382; 295/11; 301/6 WB
[58] Field of Search .................. 74/443, 574; 105/452; 238/382; 295/7, 11, 31 R, 33, 34, 11; 64/1 V; 181/209, 211, 258, 266, 276; 188/1 B, 218 A; 192/30 V; 301/6 WB

[56] References Cited

U.S. PATENT DOCUMENTS

| 1,023,574 | 4/1912 | Lindblad | 295/11 |
| 1,782,285 | 11/1930 | Bourdon | 295/7 |
| 2,033,863 | 3/1936 | Piron | 295/31 R |
| 2,168,900 | 8/1939 | Eaton | 295/7 X |
| 2,605,132 | 7/1952 | Watter | 295/7 |
| 2,880,599 | 4/1959 | Hlinsky | 181/209 X |
| 3,377,097 | 4/1968 | Swanson | 295/7 |
| 3,388,772 | 6/1968 | Marsh et al. | 188/1 B |
| 3,791,481 | 2/1974 | Yazaki | 181/209 |
| 4,183,572 | 1/1980 | Albrecht et al. | 188/1 B |
| 4,203,546 | 5/1980 | Raquet et al. | 238/382 X |

FOREIGN PATENT DOCUMENTS

| 1605065 | 6/1971 | Fed. Rep. of Germany | 295/7 |
| 1357309 | 2/1964 | France | 295/11 |
| 718013 | 11/1954 | United Kingdom | 295/31 R |

OTHER PUBLICATIONS

VDI Journal, Von H. Stappenbeck, Das Kurven-geräusch der Strassenbahn, Möglichkeiten zu seiner Unterdrückung, Feb. 21, 1954, pp. 171–175.

Primary Examiner—Joseph F. Peters, Jr.
Assistant Examiner—Howard Beltran
Attorney, Agent, or Firm—McAulay, Fields, Fisher, Goldstein & Nissen

[57] ABSTRACT

A vibration absorbing track wheel having one or more different natural frequencies. The wheel body has a wheel flange with one or more resonance absorbers on the wheel flange. Each resonance absorber comprises at least two tongues and an intermediate layer of damping material between each of the two adjacent tongues, and each tongue is turned to a different natural frequency of the wheel.

33 Claims, 25 Drawing Figures

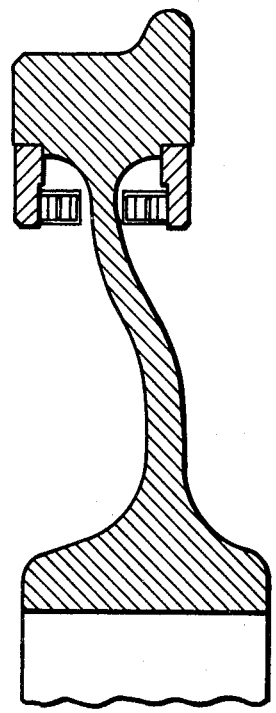
FIG. 18a
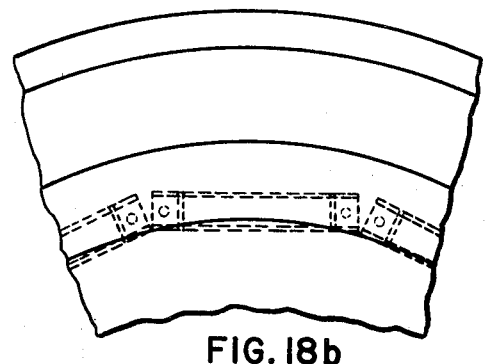
FIG. 18b
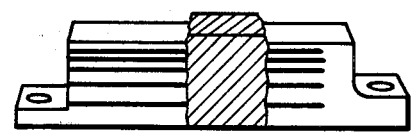
A
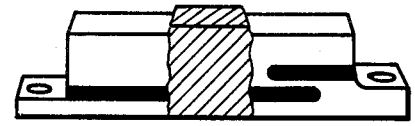
B
FIG. 18c
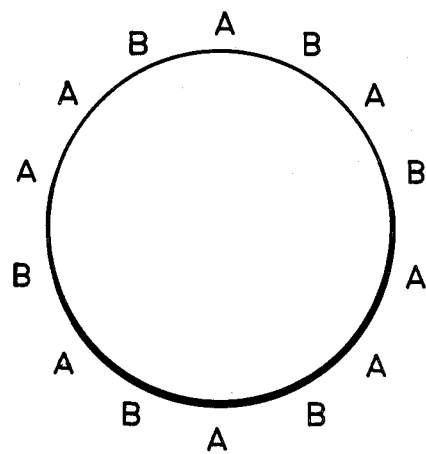
FIG. 18

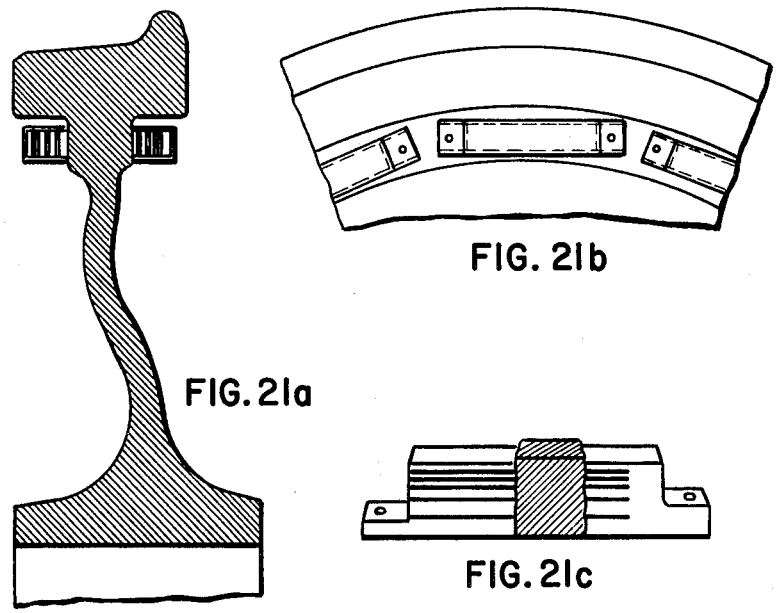
FIG. 21a
FIG. 21b
FIG. 21c
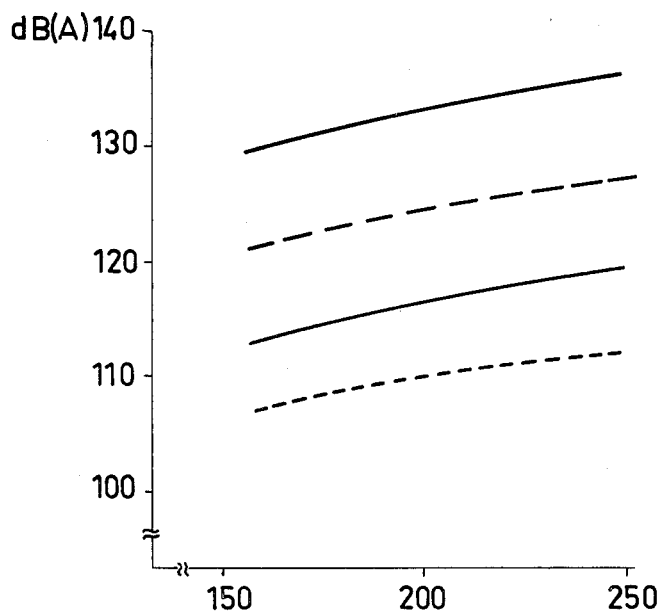
FIG. 22

VIBRATION DAMPED RAILWAY WHEEL

BACKGROUND OF THE INVENTION

1. Field of the Invention

This invention relates to a vibration absorbing track wheel. More particularly, the invention is concerned with a track wheel having several resonance absorbers which are composed of mass and damping material arranged on the wheel body. In particular, the resonance absorbers are associated with the wheel flange, the wheel tire or wheel rim, and are distributed over the periphery thereof.

2. Description of the Prior Art

Attempts have been made to dampen the axial vibrations which are responsible for producing the screeching noise. One proposal is to use a ring composed of damping material which is attached to the wheel flange. The effect achieved thereby, however, was not satisfactory (German Offenlegungsschrift 1 605 065).

Further attempts have been made to dampen the noise by damping annular bodies or annular body parts, which are set in annular grooves in the wheel flange. These annular body parts are composed of individual small plates, ring sections or ring discs and are coated with highly viscous, lubricant-type material on their contact surfaces. This attempt has not been successful in practice.

Another attempt to dampen the noise proposes the use of resonance absorbers with the track wheel of the aforementioned type. These resonance absorbers are secured to the wheel disc in the proximity of the wheel flange. Each resonance absorber comprises a cylindrical rubber bumper with two metal discs molded onto the front surface thereof with let-in screwbolts. However, it was shown in practice that after a relatively short period of operation of one year that the damping efficiency dropped substantially with the vibration absorbing track wheel of the aforedescribed type. For this reason, such a vibration absorbing track wheel has not been successful in practice (VDI Journal, Vol. 96, No. 6, 21.2.1954, pages 171–175).

It is therefore an object of the invention to provide a resonance absorber for track wheels to absorb more effectively those vibrations which arise at the wheel and, above all, for a longer period of time.

SUMMARY OF THE INVENTION

The invention further proposes that each resonance absorber be composed of several tongues which are separated from one another by means of intermediate layers of damping material, and the several tongues are to be tuned to different natural frequencies of the wheel.

In a track wheel with one or more resonance absorbers the vibrations are effectively absorbed for long periods. The tongues, which each form a set and are tuned to different natural frequencies of the wheel, can be constructed in various ways. According to a first embodiment when the tongues are used with a solid wheel, they are produced by annularly turning out the wheel flange, or when a wheel with a tire is used, the tongues are produced by turning out the wheel rim. In this embodiment, the rings produced are divided by radial cuts, into individual sets corresponding to the resonance absorbers.

According to another embodiment, the tongues can be produced by turning out separate rings which are secured by means of screw bolts to the wheel. In this embodiment, the rings are divided by radial cuts into individual sets corresponding to the resonance absorbers.

According to a further embodiment which is simpler from the production point of view, the tongues are composed of plates, especially with the same height and length but varying in thickness or width. These plates can be arranged either in parallel or meander-like (in series) on the same base. In this way, all the two or more tongues which are arranged on the same base form a set of tongues. Each of these sets of tongues can form a block which is fixedly secured on the wheel body. The blocks can be secured directly on the wheel body. However, they are preferably secured on a ring which is shrunk into recesses in the wheel body. These recesses can be provided in the wheel flange, the wheel tire or the wheel rim. The blocks are connected to the rings by screw connections.

The expense of construction of securing the individual sets of tongues can be kept at a low level if each two adjacent sets of tongues are formed on or allotted to a common base.

The base which bears the plate-like tongues is preferably constructed as a bundle of tongue ends. When a common base is used to support double tongues, then a bundle of the central sections of the distance or spacer plates are used which are welded with the tongues, and the cover plates may also be welded to the tongues. Such a base is favorable and quite desirable both from the viewpoint of production and from that of assembly, as only the plate-like tongues and the distance plates have to be layered one on top of the other and connected together, and then spanned or connected to the wheel body.

Instead of using plate-like tongues, rod-shaped tongues can be used. The rod-shaped tongues are formed desirably of round stock which have different diametrical dimensions. In particular, rods which vary in diameter can be used. Hollow rods with varying dimensions can be used. In particular the diameter of the rods can vary, and the wall thickness or both the wall thickness and rod diameter can vary in dimension. In such a case, the hollow rods can be arranged partly coaxial to one another and spaced from one another, so that the intermediate spaces between the rods can be filled with the damping material. Also, the inner rod may be either a solid rod or a hollow rod filled with damping material. Although it is also fundamentally possible with the aforedescribed rods to construct the base from the rod ends or centers of the rods and distance elements and to span or weld them together, the base can also be composed of a compact or perforated block, and the rods can be welded to or inserted into the block.

Each of the tongues forms a block and is fixedly connected at its base with the wheel body. Such connection takes place in particular with the wheel flange, the wheel tire or the wheel rim. The tongues and the block are preferably embedded in an annular groove of the wheel body, and in particular they are embedded in the damping material. This arrangement not only achieves a compact construction of the track wheel with the resonance absorbers, but it also provides a coupling, which is favorable for diverting the wheel vibrations, between the wheel flange, the wheel tire or the wheel rim and the resonance absorbers. The additional production costs necessary to turn out or cut the annular grooves are hardly of importance, since the wheel must be spanned or turned in a turning lathe in order to turn the diameter of the outer contours. The annular grooves protect the blocks from outside influences when in operation, and the grooves also provide the blocks with the ability to effect a good hold in connection with the damping material in which the blocks are embedded. Therefore, for example, only a single screwbolt needs to be provided in each case to secure the blocks to the wheel body. The tongues embedded in the wheel body do not produce any noise, e.g. wind noise, due to this arrangement.

In addition an annular groove is provided on each side of the wheel body and the tongues arranged in the wheel body are also preferably provided on each side of the wheel body. In particular, the grooves are provided on both sides of the wheel tire, the wheel flange or wheel rim. The damping effect is further improved by this two-sided arrangement.

In order to make optimum use of the space provided by the annular groove, the tongues are also curved according to the radius of curvature of the annular groove.

When the track wheel is rubber-cushioned, and the wheel tire thereof is connected to the wheel rim by means of a rubber insert, then the resonance absorbers are arranged in the annular grooves on the wheel tire, and preferably on both sides of the wheel tire. The combination of rubber-cushioned track wheel and resonance absorbers attached to the wheel body results in particularly good damping effects.

Aluminum and steel are suitable as materials for the tongues.

The production or manufacture of the track wheel according to the invention with resonance absorbers embedded in annular grooves in the wheel flange, the wheel tire or wheel rim is carried out in the following manner: The tongues, which are arranged on the same base, are secured to the wheel body. Preferably, the tongues are secured to the wheel flange, the wheel tire or wheel rim. The remaining intermediate spaces between the tongues are filled up with damping material. In one embodiment the material is placed between the tongues, and in another embodiment, the damping material is placed between the tongues and the sides and base of the annular grooves. Preferably, a mass which is free-flowing before hardening is used as the damping material. The mass produces a plastic mass after hardening which has a Shore hardness of 20 to 60 Shore and high inner damping, such as silicon caoutchouc (unvulcanized rubber).

Other objects, advantages and the nature of the invention will become readily apparent from the detailed description of the various embodiments of the invention taken in connection with the accompanying drawings.

BRIEF DESCRIPTION OF THE DRAWINGS

FIG. 18 shows a composite view with several figures to show a solid track wheel constructed in accordance with FIGS. 5 to 7; FIG. 18a shows the solid track wheel in semi-axial cross-section in the upper left hand side of the drawing. FIG. 18b in the upper right hand side of the drawing shows a top view in section. FIG. 18c shows two resonance absorbers at the center right of the drawing; resonance absorber type A is of the type in FIG. 7, and resonance absorber B is of the type in FIG. 6;

FIG. 21a shows a semi-axial cross-section of another railway wheel in the form of a solid wheel;

FIG. 21b shows a partial top view of a railway wheel having resonance absorbers mounted thereon;

FIG. 21c is an isometric view of a resonance absorber; and FIG. 22 shows a graphical representation for the sound level of the track wheel according to FIG. 21 which is produced by running on the rail. The upper curve is shown in full line without a resonance absorber and shown in dotted lines with the use of a resonance absorber. The second group of curves, beneath the two shown above, show in full outline the effect without the resonance absorber and in dotted lines the effect with a resonance absorber with a ground surface, tracing the speed.

DESCRIPTION OF THE PREFERRED EMBODIMENTS

Figure 1:
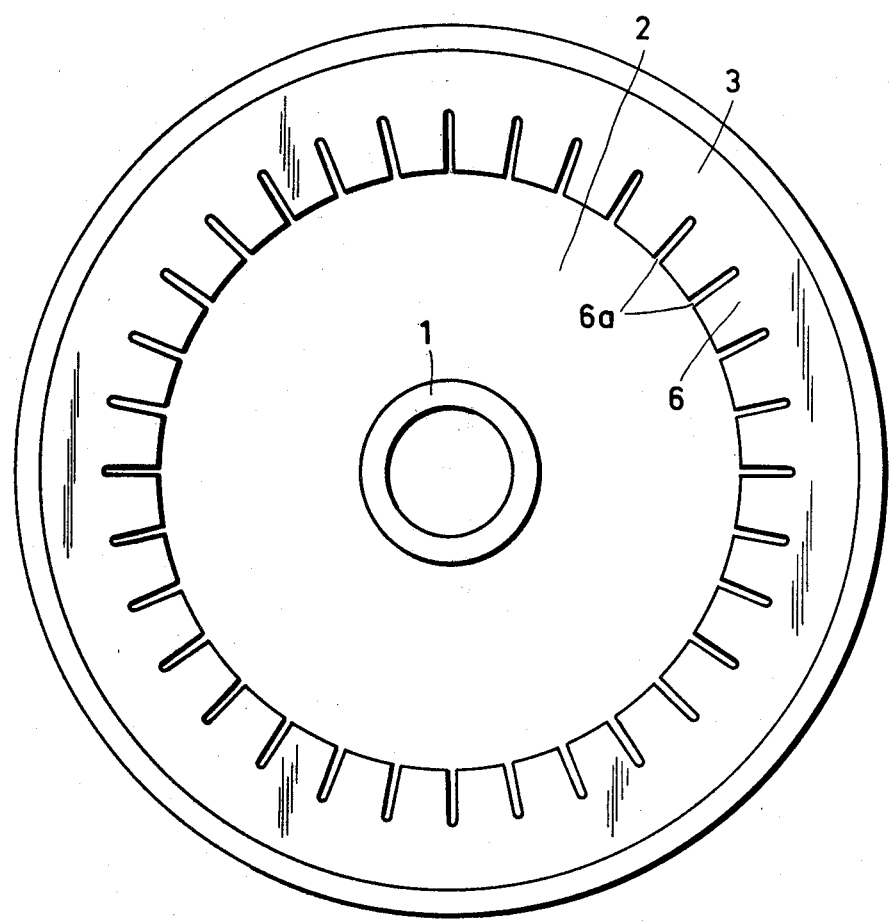
FIG. 1 is a side view of a track wheel with tongues laterally arranged on the wheel flange. In this embodiment, the track wheel is a solid wheel with the tongues laterally arranged on the wheel flange.
Figure 2:
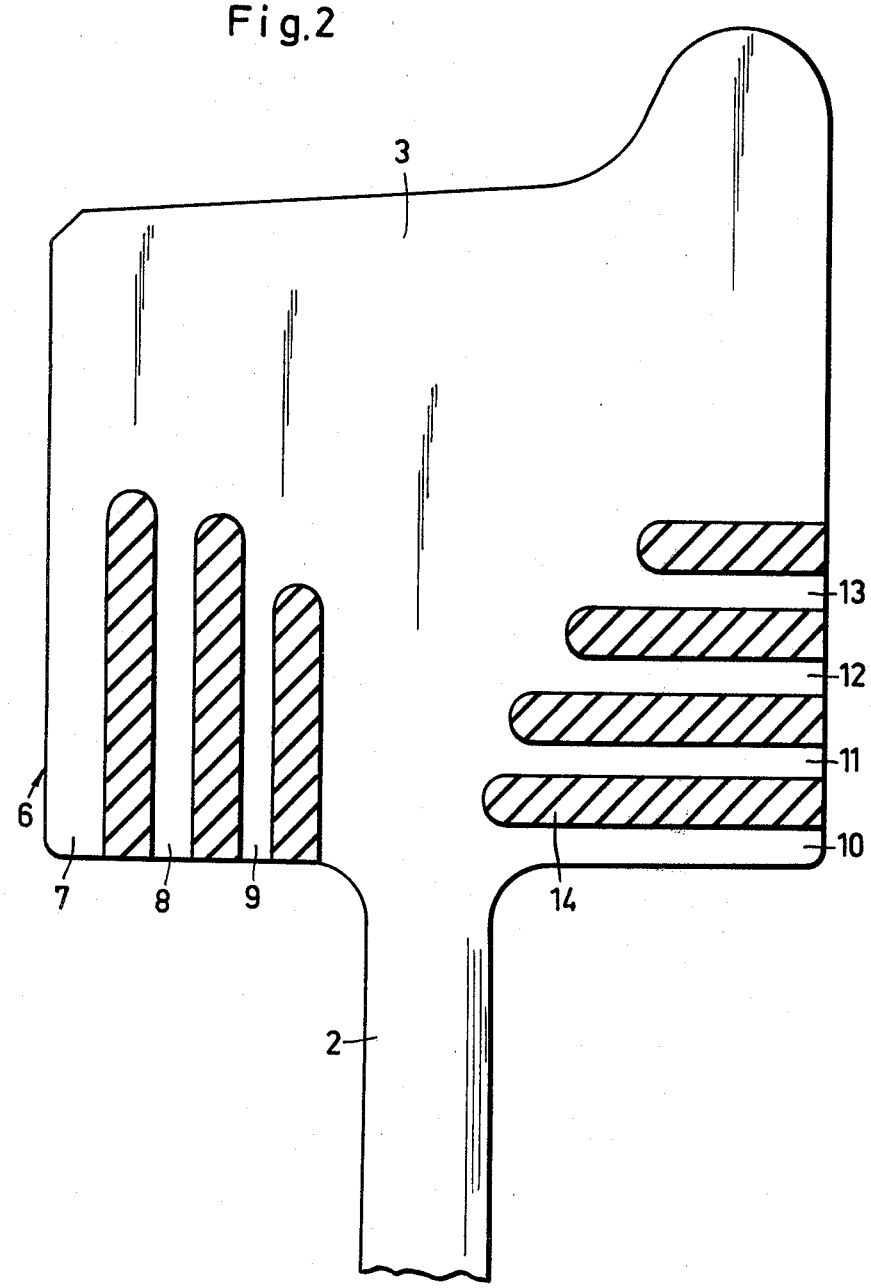
FIG. 2 is a partial axial cross-sectional view of the wheel of FIG. 1.

Referring more particularly to FIGS. 1 and 2 which illustrate a track wheel formed of a solid material comprising a hub 1, a wheel disc 2 and a radial wheel flange 3 connected to hub 1 by the wheel disc 2.

Wheel flange 3 is provided with a plurality of resonance absorbers 6 distributed over the periphery on the inside facing hub 1. The resonance absorbers 6 include a plurality of tongues 7, 8, 9, 10, 11, 12 and 13. Positioned between each pair of adjacent tongues is an insert 14 formed of a vibration absorbing material.

Figure 3:
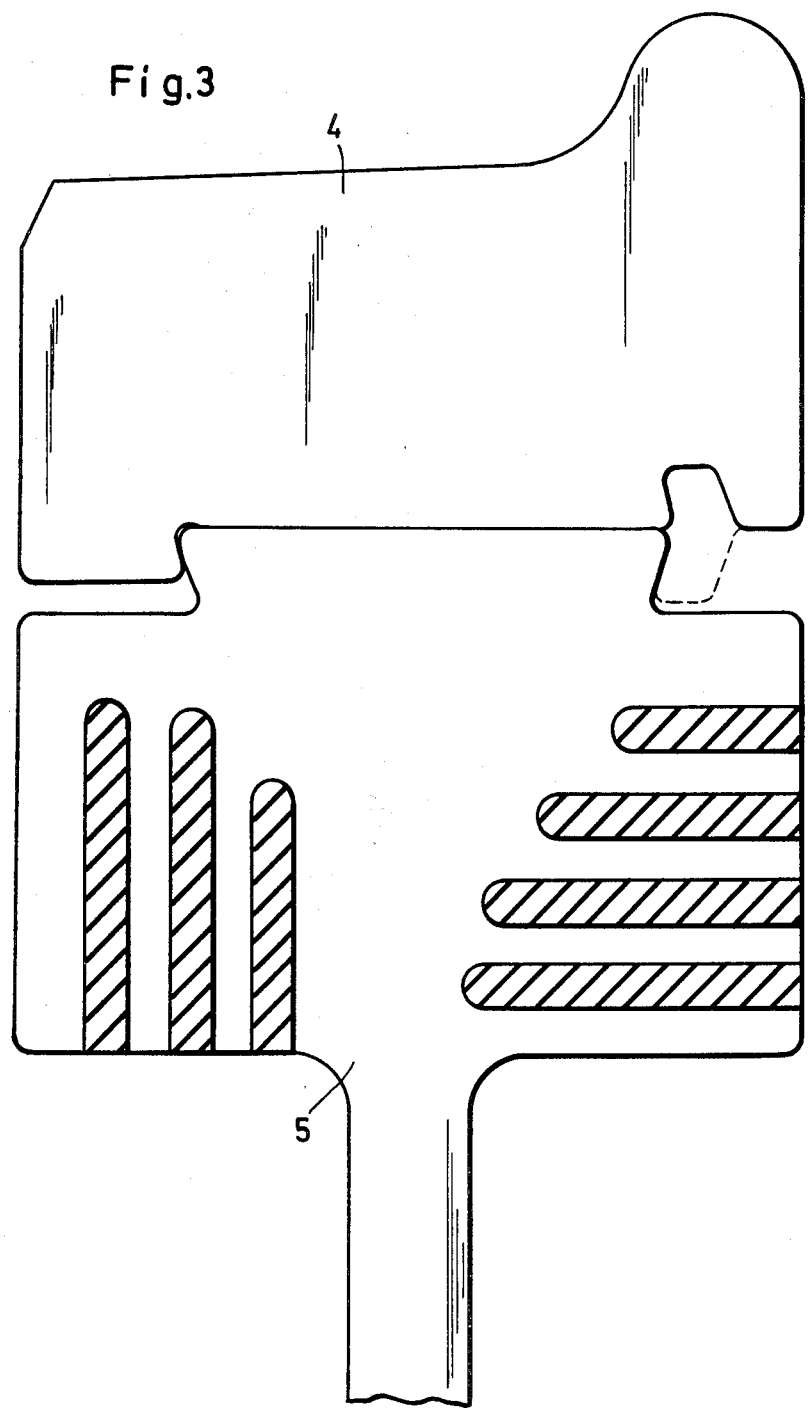
FIG. 3 is a partial axial cross-sectional view similar to the view of FIG. 2, but illustrating a modification thereof. In this embodiment, the wheel is provided with a tire and with the tongues arranged on the wheel rim.

In FIG. 3, the track wheel is constructed with a tire 4 which is attached to a wheel rim 5. The wheel rim 5 extends from the wheel disc. Throughout the description, the same reference numerals refer to the same parts.

Figure 4:
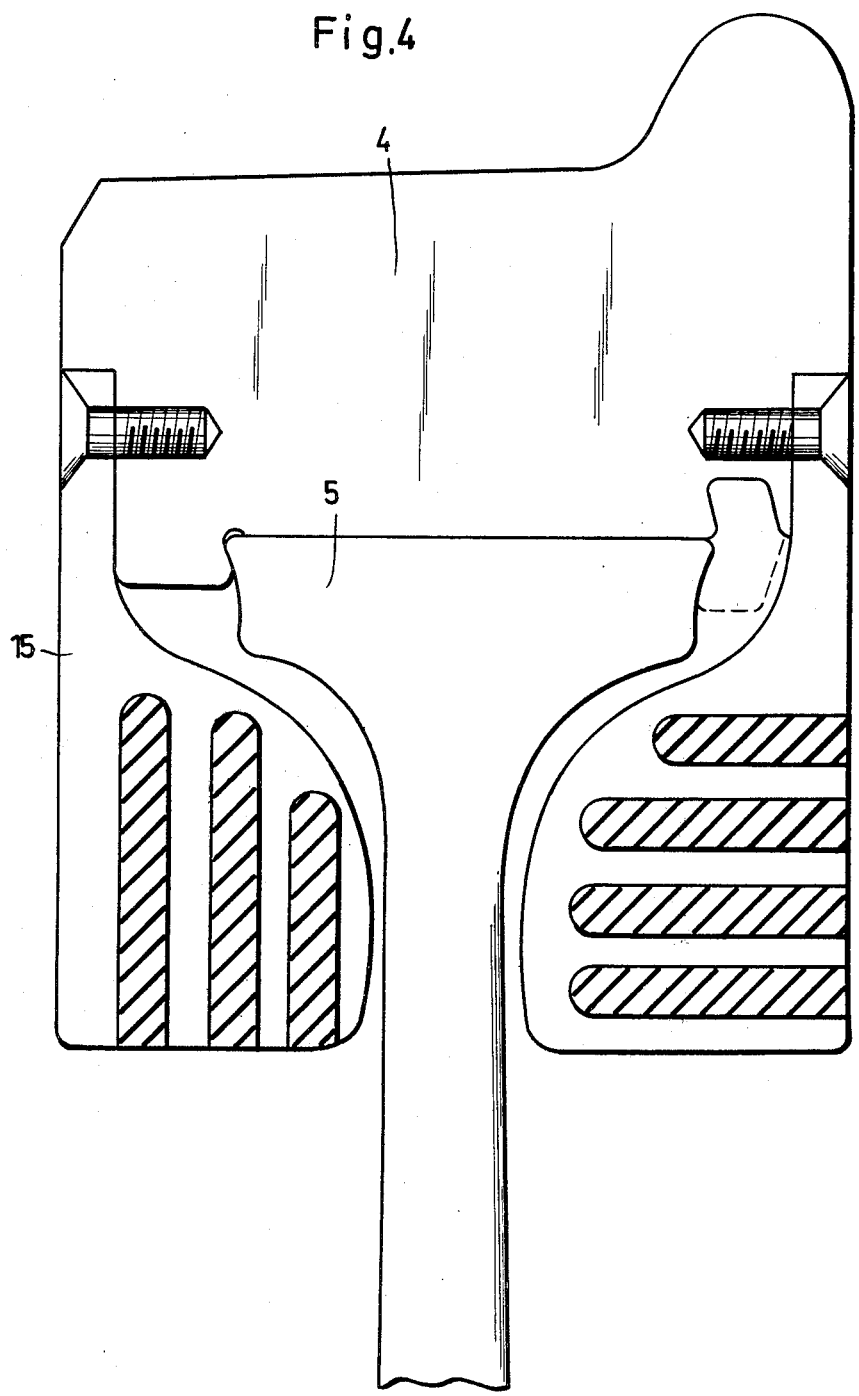
FIG. 4 is a partial axial cross-sectional view similar to FIG. 2, but illustrating another modification thereof. In this embodiment, the wheel is provided with a tire and separate rings secured to the tire; and, the tongues are arranged in the separate rings.

A modification of the track wheel is shown in FIG. 4, and separate rings 15 are connected to the wheel tire 4. Rings 15 carry tongues 17 to 13. In both FIGS. 3 and 4, the wheel flange is divided into the wheel tire 4 and wheel rim 5.

While the embodiments shown in FIGS. 1 to 4 are somewhat different from each other, they have a number of features in common. Specifically, the wheel flange 3, the wheel tire 4 or the wheel rim 5 bear a plurality of resonance absorbers 6 distributed over the periphery on the inside facing the hub 1. These resonance absorbers 6 are composed of the tongues 7, 8, 9, 10, 11, 12, 13 and the inserts 14 of vibration absorbing material which are arranged between the tongues. The individual tongues 7 to 13 are produced by being annularly turned out from the full material of the wheel. The rings thus produced are then divided into individual sets by means of radial cuts 6a as best seen in FIG. 1. In particular, the wheel flange can be divided by the radial cuts 6a and the resonance absorbers 6 are positioned on opposite sides of each of the radial cuts 6a. The length and width of the tongues 7 to 13 are decisive in order that the tongues can be tuned to the natural frequency of the wheel. The position of the tongues 7 to 13 is also decisive to control the direction in which the vibrations are absorbed. In order to absorb axial vibrations, it is necessary to arrange the tongues in a direction extending in the direction of the axis of wheel disc 2, and for this purpose tongues 7, 8, and 9 are arranged. These tongues 7, 8 and 9 are arranged in radial planes lying one behind the other, and they can swing in the axial direction. For absorption of the radial vibrations, the tongues 10 to 13 are provided. These tongues 10 to 13 are arranged one above the other in coaxial planes. As tongues are provided in each section of the periphery which respond to both radial and axial vibrations of different natural frequencies, then both the axial and the radial wheel vibrations will be absorbed at the point where they are produced, i.e. at the wheel flange and on the wheel tire, so that the optimum noise damping is obtained.

As best seen in FIGS. 2 to 4, for the solid wheel shown in FIG. 2, the tongues can be produced from the wheel flange; for the wheel rim 5 and the tire 4 of FIG. 3, and for the tired wheel of FIG. 4 which is provided with separate rings 15 secured by means of bolts having a screw shank to the tire 4, the tongues can be made by being annularly turned out and subsequently divided radially.

Figure 5:
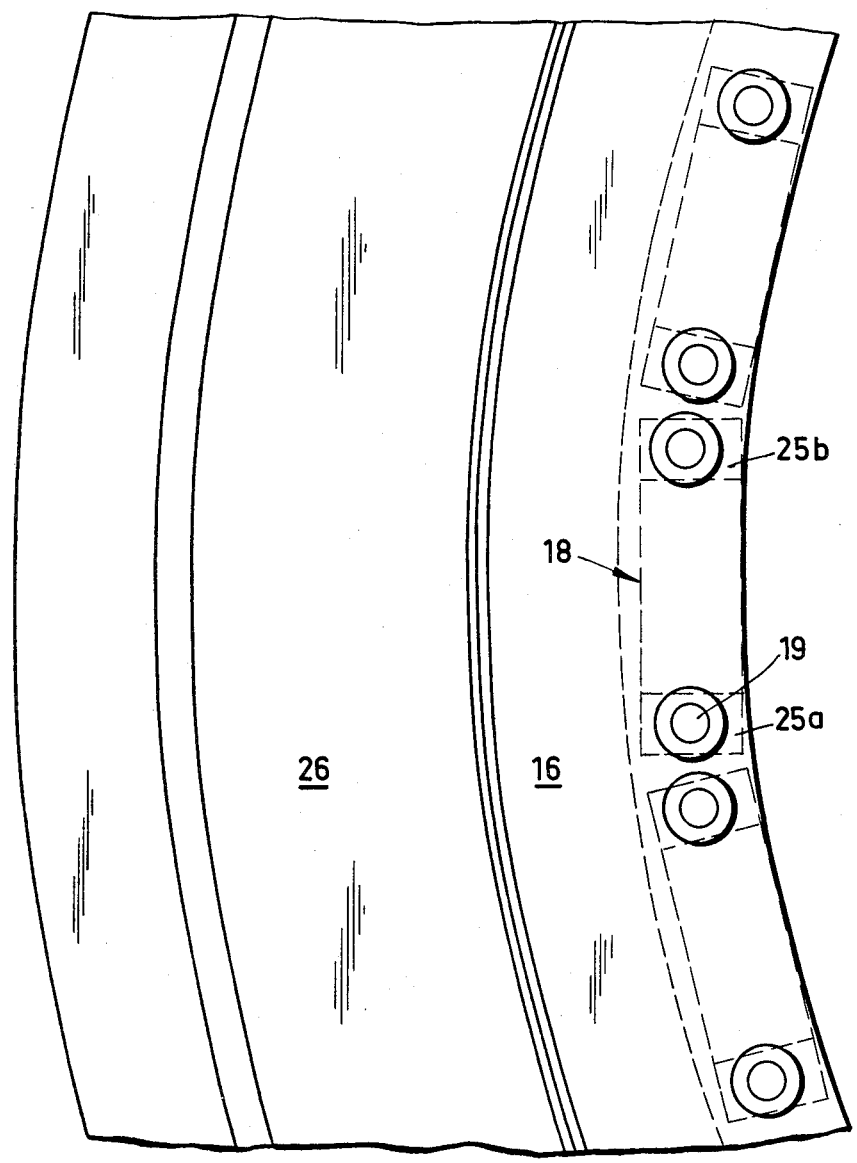
FIG. 5 is a partial side view in the area of the wheel flange illustrating a section of a solid track wheel.
Figure 6:
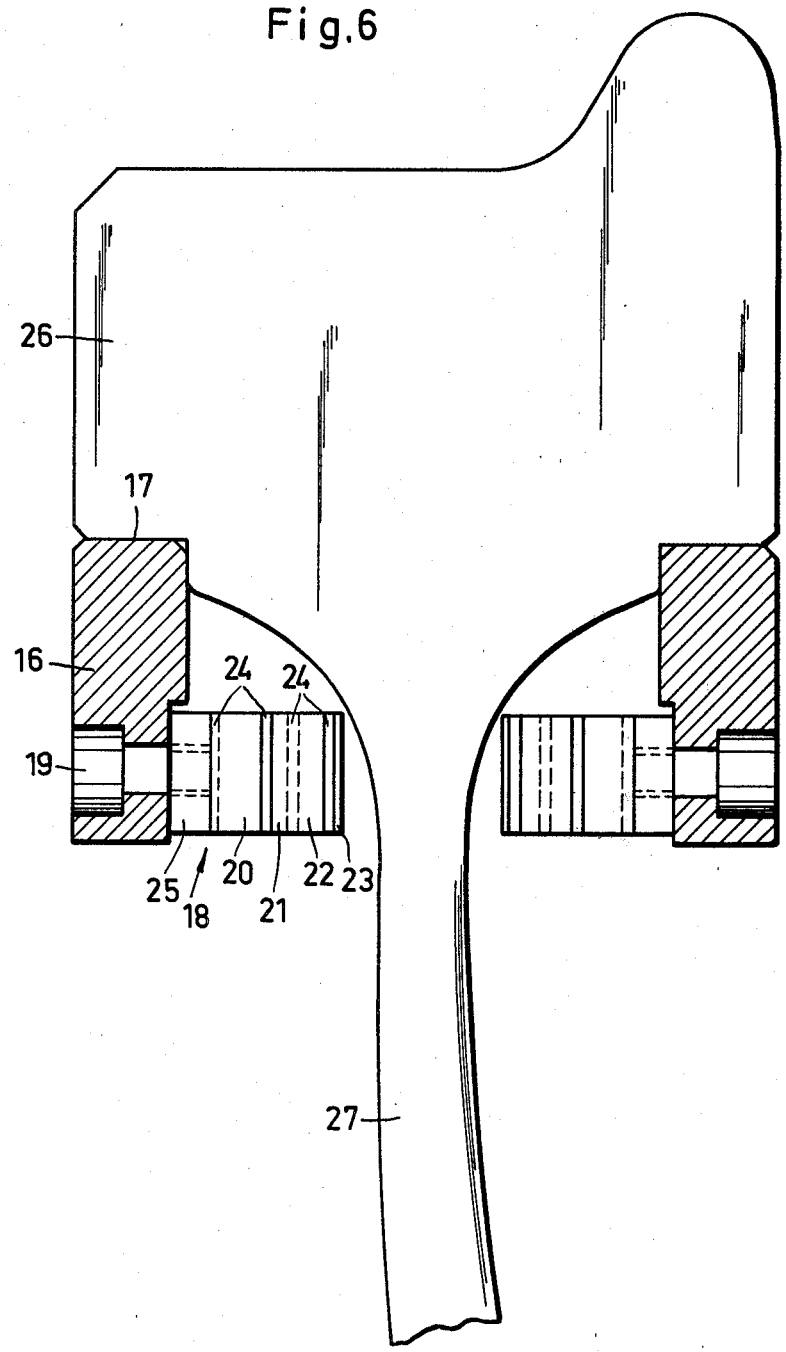
FIG. 6 shows a part of the track wheel according to FIG. 5 is axial cross-section. In this emodiment, the tongues are sets of tongues which have been combined to form blocks and are arranged meander-like to one another or in series with one another.

Referring now to FIGS. 5 to 8, and more particularly to FIGS. 5 and 6, wheel disc 27 has a wheel flange 26 provided with a recess 17 to receive a ring 16. The ring 16 is shrunk into recess 17 and holds individual blocks 18 by means of screw bolts 19. Block 18 is composed of a base 25, of several tongues 20, 21, 22 and 23 and an insert 24 of vibration absorbing material positioned between each pair of adjacent tongues. The tongues are all arranged in series on the same base 25.

In the FIGS. 5 and 6 embodiment, the individual sets are not worked from one piece with the wheel, but form the individual blocks 18 which are secured to the wheel. Each block 18 which is composed of several tongues 20 to 23 are equal in height and length but vary in thickness.

The tongues 20 to 23 are tuned to the natural frequencies of the wheel by the selection of their different thicknesses. The tongues 20 to 23 are arranged meander-like or in series one above the other on the same base 25. The individual blocks 18 thus formed as best seen in FIG. 5 are screwed by means of the screwbolts 19 onto the ring 16 which is shrunk into the recess 17. The blocks 18 are arranged on the rear side of the ring 16 in such a manner that the tongues 20 to 23 are positioned in the free space of the passage from the wheel flange 26 into the wheel disc 27, and the planes of the tongues are vertical to the axis of the wheel disc.

As can be seen from FIG. 5, the base 25 has attachments 25a, 25b in which the bores for the screwbolts 19 are provided.

Figure 7:
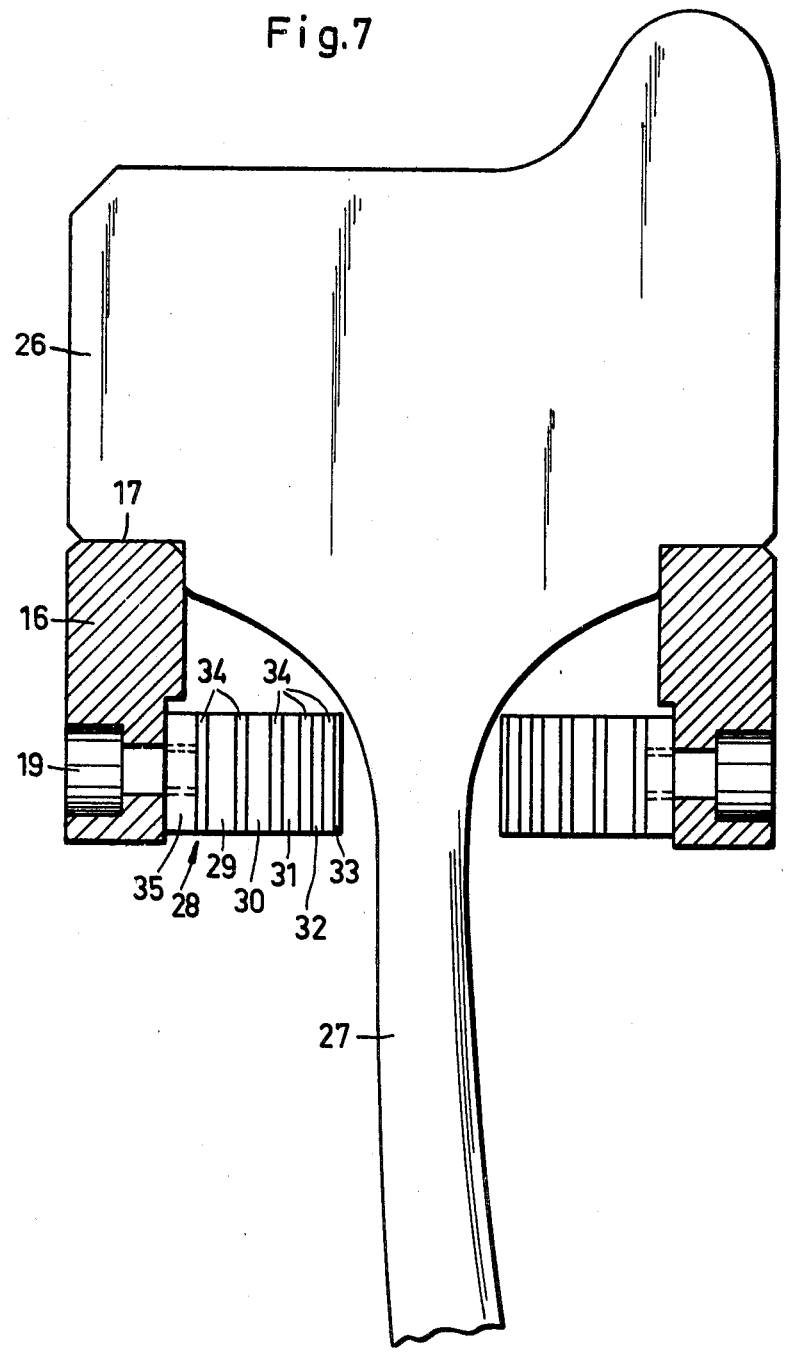
FIG. 7 shows a part of the track wheel according to FIG. 5 in axial cross-section. In this embodiment, the tongues are in parallel as opposed to the meander-like arranged tongues of FIG. 6.

In FIG. 7, a modification of the embodiment of FIGS. 5 and 6 is shown with parallel tongues 29 to 33. The same reference numerals designate the same parts, and individual blocks 28 are connected by means of the screw bolts 19 to ring 16. Each block 28 includes the parallel tongues 20 to 33, which are connected to the same base 35 by means of a common crosshead. Between each pair of adjacent tongues, inserts 34 of vibration absorbing material are provided. The tongues are the same height and length, but vary in thickness.

Figure 8:
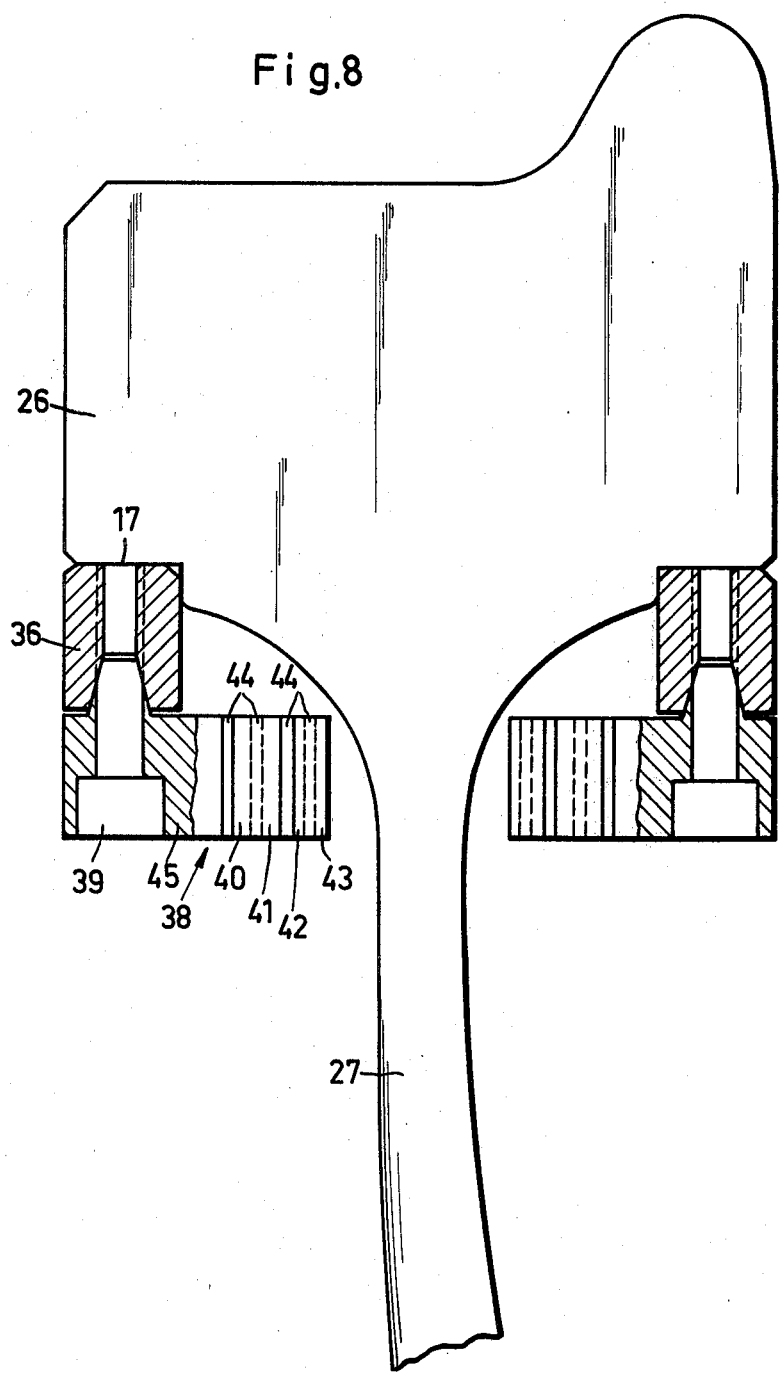
FIG. 8 shows a part of the track wheel in axial cross-section similar to that of FIG. 5 with an alternative fixture of the tongues combined to form blocks approaching those of FIGS. 6 and 7.

Referring now to FIG. 8 which shows another modification of the embodiment of FIGS. 5 and 6, the same reference numerals designate the same parts throughout, rings 36 are shrunk into recess 17 and carry the individual blocks 38.

In the embodiment of FIG. 8, the blocks 38 are arranged meander-like one above the other as in FIGS. 5 and 6. Each block 38 includes the base 45 and is formed by tongues 40 to 43 thereon and which are separated from one another by inserts 44 of vibration absorbing material. The tongues are equal in height and length but vary in thickness. In this embodiment, as distinguished from the embodiments of FIGS. 6 and 7, the blocks 38 are secured on the inside of shrunken rings 36 by means of screwbolts 39. The position of the individual tongues 40 to 43 in the free space of the passage from the wheel flange 26 into the wheel disc 27 remains untouched by this different type of securing.

Alternatively, it is also possible to eliminate rings 16, 26 and 36 to secure the described blocks 18, 28 and 38 directly onto the wheel disc 27 by means of screwbolts, and preferably close to the rim or the wheel flange 26. In this case, the transition area should be turned out more than usual so that securing can be carried out as near as possible to the wheel flange or rim.

In the FIGS. 5 to 8 embodiments, the tongues which are arranged on the same base form a block which can be fixedly secured to the wheel body. While the drawing shows securement to the wheel flange 26 by means of the rings, other forms of securement to the track wheel and different parts thereof is possible.

Referring now to FIGS. 9 to 13, the track wheel is shown with a flange 51 having two oppositely facing sides 52, 53. Each of these sides 52, 53 has an annular groove 54, 55 facing the hub of the track wheel. A plurality of blocks 56 to 58 are arranged in a peripheral direction one behind the other in these annular groove 54, 55. Each block 56 to 58 is composed of several plate-like tongues 61 to 65 which are equal in length and height but vary in thickness. The tongues 61 to 65 are held apart in the center by short distance plates 66 of equal thickness and covered by a lower plate 67 which is equally short and thick, and by an upper plate 68 which is equally short but thicker to provide greater rigidity.

A compact bundle is formed from the tongues 61 to 65, the distance plates 66 and the coverplates 67, 68, and this compact bundle of plates is held together by welding beads 69 (FIG. 11) which are drawn over the outer edges. In this way, the central sections of the tongues 61 to 65 form a fixed base 46 (see FIG. 13) with the distance plates 66 and the cover plates 67, 68. The tongues 61 to 65 of blocks 56 to 58 are free and are held together by the cover plates 67, 68.

The base 46 which bears the plate-like tongues 61 to 65 is constructed as a bundle of tongue ends which are welded together as a unit with the intermediate distance plates 66 and the outer cover plates 67,68. The tongues can also be double tongues which are borne by the common base 46 and welded together with the plates 66, 67 and 68. Each block 56, 57 and 58 comprises two bases 46 and 47. Base 47 is formed in the same manner as base 46.

In order to secure blocks 56 to 58 to the wheel flange 51, a screw bolt 71 is provided which passes through openings 70 in bases 46 and 47.

When the tongues 61–65 are to be used with the annular grooves 54,55 they are curved in such a manner that they follow the radius of curvature of the annular grooves 54,55. When a wheel rim together with a wheel tire is used, the wheel tire is provided with the annular grooves to receive the tongues.

Blocks 56 to 58 and the bases 46,47 are formed with the central bore 70 for the screwbolt 71. Axial bores 72 are distributed in the area of the annular grooves 54,55 in the wheel flange 51 and are provided so that it is possible to connect each of the blocks 56 to 58 lying opposite each other in the annular grooves 54,55 with a single screwbolt 71. The opposing blocks 56 to 58 lie with their lower cover plates 67 directly on the floor or base of the groove so that when the screwbolt 71 is spanned, a fixed connection is produced between the compact bases 46,47 for each of the opposing blocks and the wheel flange 51.

Figure 9:
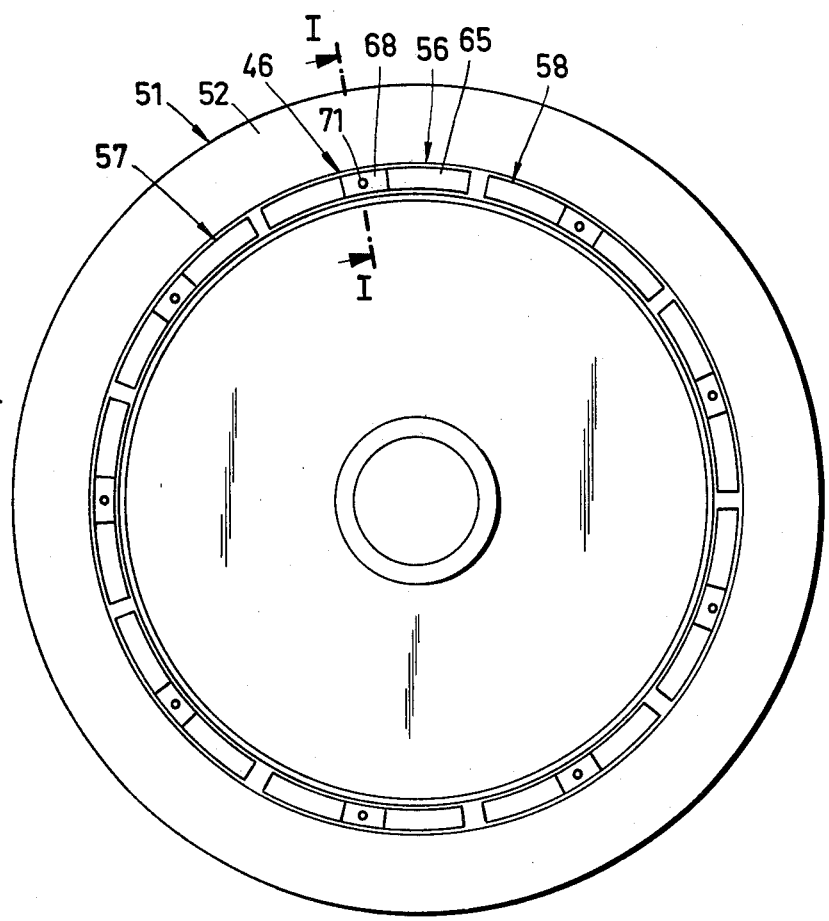
FIG. 9 shows a top view from the wheel tread side of a track wheel which is different from those of FIGS. 1 to 8. In this embodiment, the tongues are embedded in a lateral annular groove of the wheel flange.

As can be seen from FIG. 9, blocks 56 to 58 are arranged one behind the other and are positioned so as to fill gaps. Space is left both between the base of the groove and the blocks 56 to 58, and space is left between the side walls of the grooves 54,55 and the blocks 56 to 58. As soon as the blocks 56 to 58 fill the grooves 54,55 and are connected with the wheel flange 51 by means of the screwbolts 71, the annular grooves 54,55 are then filled in with a damping material, e.g. with silicon caoutchouc. This damping material is added in a flowable state and can flow through the gaps and fills the intermediate spaces 75 between the individual tongues 61 to 65 and all additional or further hollow spaces in the grooves 54,55. Specifically, the gaps 73,74 between the side walls of the annular grooves 54,55 and the outsides of the blocks 56 to 58 are filled with the damping material so that the tongues 61 to 65 are finally and completely all embedded in the damping material. After the free-flowing damping material has solidified, the tongues 61 to 65 together with the inserts 75 of damping material lying between them form the resonance absorbers which are tuned to different frequencies. As noted, heretofore, the tongues are all of the same length and width, and they vary in thickness.

The base on which the tongues are formed can be formed from a compact or perforated block.

Referring now to FIGS. 14 to 17 which shows another set of tongues forming a block 76 bolted by means of bolt 81 to a wheel flange 78 or the like.

Figure 16:
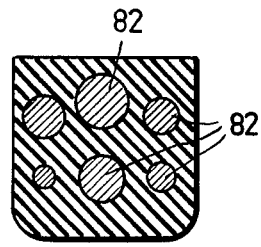
FIG. 16 is a sectional view taken along lines V—V of FIG. 14 showing another embodiment of the set of tongues according to FIG. 12.

Two different types of tongues are shown for use with the FIGS. 14 to 17 embodiments. As shown in FIG. 16, the tongues 82 are in the form of solid round parallel rods, and in FIG. 17, the tongues 83 are in the form of hollow round parallel concentric tubes or rods spaced from each other to form intermediate spaces and which encircle a solid rod shaped core 84. The tongues 82 may also vary in thickness and different diameter rods may be used.

Figure 15:
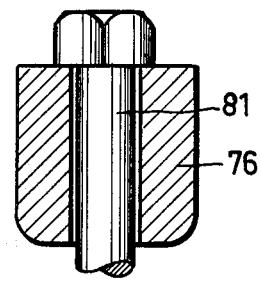
FIG. 15 is a sectional view of the block taken on line IV—IV of FIG. 14.

In FIG. 15, compact block 76 is shown with a screwbolt 81 for connection to the wheel flange 81, and the compact block 76 may also be perforated. The hollow spaced concentric tubes or rods of FIG. 17 as well as the solid rods of FIG. 16 are held within either a compact or perforated block 76. The tubes and rods 82, 83 and 84 are welded to or inserted into the base which is in the form of the compact or perforated block 76.

Figure 17:
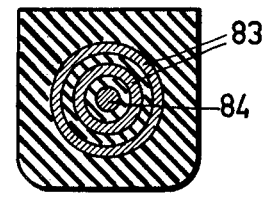
FIG. 17 is a sectional view similar to FIG. 16 also taken according to line V—V of FIG. 11 and showing another embodiment of the set of tongues.

The rod ends shown in FIGS. 16 and 17 can be welded together and provided with distance or spacer elements. When the rods are in the form of double tongues borne by a common base, the central rod sections forms a base.

Figure 10:
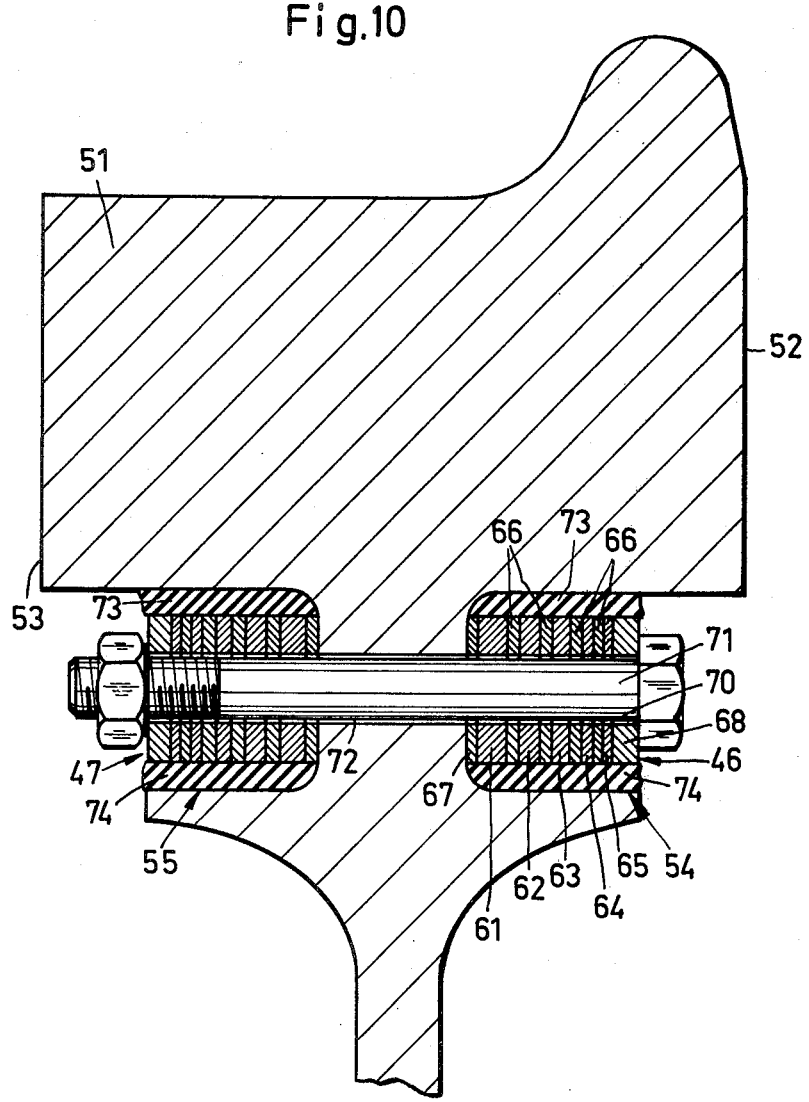
FIG. 10 is an axial cross-sectional view taken on line I—I of FIG. 9 and shows a part of the track wheel according to FIG. 9.
Figure 11:
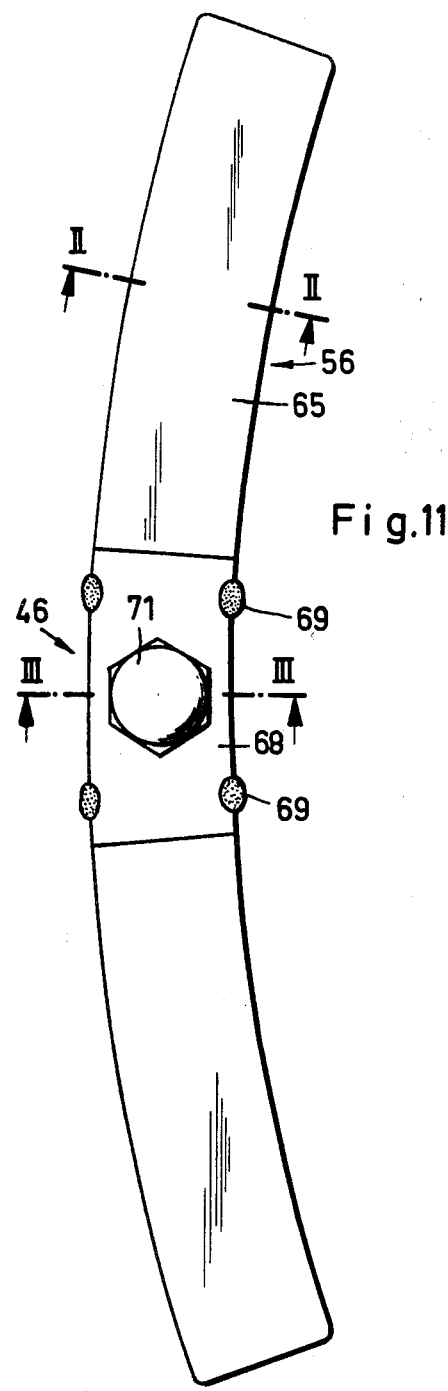
FIG. 11 is a top view of a set of tongues which form a block.
Figure 12:
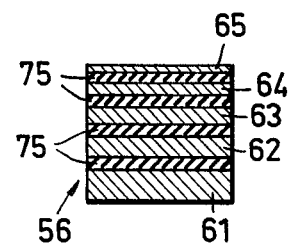
FIG. 12 is a sectional view of the block of FIG. 11 taken in section along line II—II.
Figure 13:
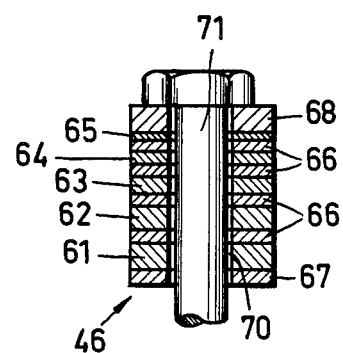
FIG. 13 is a sectional view of the block taken on line III—III of FIG. 11.
Figure 14:
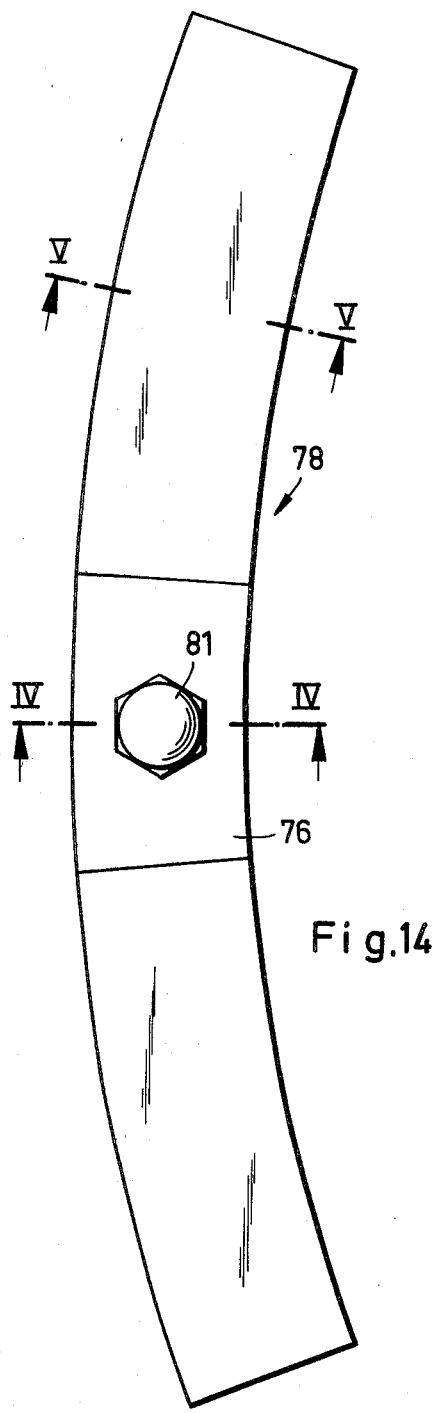
FIG. 14 is a top view of a further set of tongues forming a block.

The tongues 82–84 are welded onto the opposing sides of the compact block 76. The block 76 with the tongues 82–84 lies in opposing grooves of the track wheel, as represented in FIG. 10. As the grooves are completely filled with the vibration absorbing material, the tongues 82–84 are also completely embedded in this vibration absorbing material.

Referring now to FIG. 18, which shows a track wheel having a diameter of 850 mm, a hub diameter of 122 mm, a hub width of 165 mm and width of wheel flange of 121 mm. The resonance absorbers of type B is shown in FIG. 6 and of type A is shown in FIG. 7 and is explained in detail by means of the discussion in connection with FIGS. 5 to 7; these absorbers are connected with the wheel by means of rings 16 positioned in recesses 17 in the wheel flange 26. FIG. 18 shows the proportion and distribution of both types of the resonance absorbers used, A and B, are shown distributed about the circle at the bottom of FIG. 18. The represented distribution of the resonance absorbers A and B is provided on both sides of the wheel.

Figure 19A:
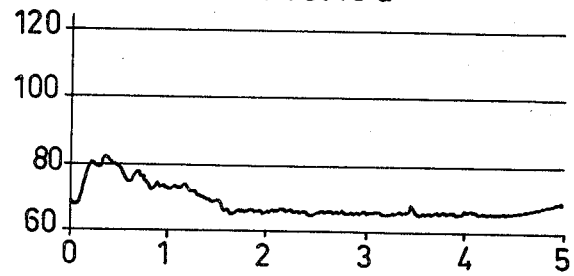
FIG. 19a shows a graphical respresentation with sound intensity level as the ordinate and frequency as the abscissa. The plot indicates the effect of the use of the resonance absorber.
Figure 19B:
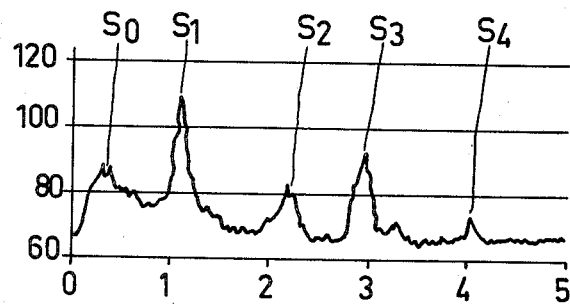
FIG. 19b shows a graphical representation indicating the sound intensity level without the use of the resonance absorber.
Figure 20:
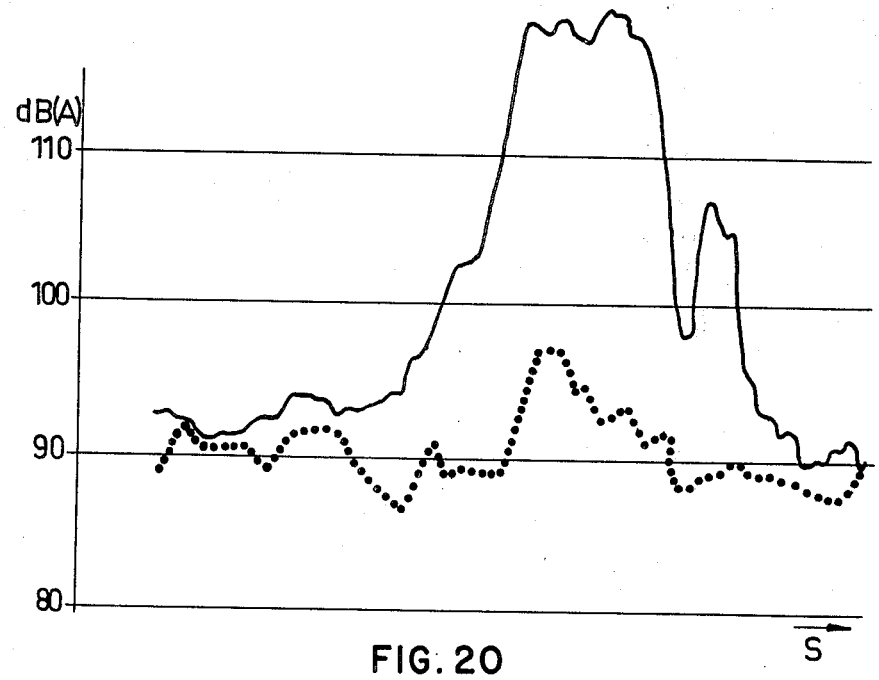
FIG. 20 is a graphical representation of two sound levels of the track wheel of FIG. 18. These sound levels are produced when the track wheel passes through a curve and tracing or following the path of the curve. The upper graphical representation is without a resonance absorber and the lower representation is with the resonance absorber.

The effect of the resonance absorbers is shown in the two graphical representations and diagrams of FIGS. 19 and 20. The peak values $S_0$ to $S_4$ are responsible for the noise. Peak values $S_1$ to $S_4$ are responsible for the screeching nosie and are represented in the lower plot of FIG. 19. The peak value $S_0$ is reduced by the type B vibration absorbers while the peak values $S_1$ to $S_4$ are reduced by the type A vibration absorbers. The tongues of the resonance absorbers are designed in such a way that they correspond to the peaks of the frequencies. A comparison of the lower diagram of FIG. 19 with the upper diagram of FIG. 19 shows, that the resonance absorbers effect a complete reduction of the peak values.

The two curves of FIG. 20 also show that the noise level of the track wheel as traced over the path on passing through a curve is considerably damped by the resonance absorbers so that the formation of noise in the area of the curve is hardly greater than in the rest of the rail area.

FIG. 21 shows a track wheel which has a diameter of 950 mm, a hub diameter of 190 mm, a hub width of 190 mm and a wheel flange width of 135 mm. Sixteen resonance absorbers of the type shown in FIG. 7 are in each case directly secured on the wheel in opposing recesses in the transitional area of the wheel disc to the wheel flange. FIG. 22 shows the noise level according to different criteria from those of FIGS. 19 and 20, that is according to speed. The two upper curves are decisive for a fully satisfactory rail surface, whereas the two lower curves are decisive for an unsatisfactory rail surface (a rail surface with ripples). In both cases a considerable damping of the noises formed results for a track wheel with absorbers. The absorbers produce the results shown with the chain lines.

While there has been shown and described what is considered to be the preferred embodiments of the invention, various changes and modifications may be made therein without departing from the scope of the invention.

We claim:

1. In a vibration absorber for absorbing the vibrations of a vibration absorbing track wheel having at least one natural frequency, said track wheel having a wheel body with a wheel flange, and at least one resonance absorber on said track wheel, the improvement comprising:
   said at least one resonance absorber including at least two adjacent and contiguous tongues each having one end rigidly connected with each other and said track wheel and a layer of damping material intermediate beween each said two adjacent tongues, said two adjacent tongues each being tuned to different natural frequencies of said wheel and being coupled over their whole length to said wheel by said intermediate damping material.

2. In the track wheel according to claim 1, wherein said wheel is a tired wheel and includes a wheel rim having at least one radial cut, and one of said tongues is positioned on opposite sides of said radial cut.

3. In the track wheel according to claim 1, wherein said wheel is a tired wheel including separate rings connected to said tired wheel, and said separate rings each have at least one radial cut, and one of said tongues is positioned on each side of said radial cut.

4. In the track wheel as claimed in claim 1, wherein said wheel is a tired wheel including separate rings connected to said tired wheel, screw-bolts connecting said separate rings to the tire of said tired wheel, portions formed by radial cuts dividing said rings, and individual sets of resonance absorbers for each said portion.

5. In the track wheel as claimed in claim 1, wherein:
   said tongues are tubes,
   said tubes having variable wall thickness and varying in diameter,
   said tubes being partly coaxial and spaced from each other to form intermediate spaces therebetween, and
   said damping material filling said tubes and said intermediate spaces between said tubes.

6. In the track wheel as claimed in claim 1, wherein said tongues are composed of a material selected from steel and aluminum.

7. In the vibration absorber as claimed in claim 1, wherein said track wheel has different natural frequencies of vibration induced during use thereof, and including:
   a ring-like radial groove between each said two adjacent tongues for receiving said layer of damping material between each said two adjacent tongues;
   said tongues extending in a radial direction of the axis of said track wheel body; and
   at least one radial cut dividing said rings into several superposed plates which are formed from said tongues of the resonance absorber.

8. In the vibration absorber as claimed in claim 1, wherein said track wheel has different natural frequencies of vibration induced during use thereof, and including:
   a ring-like axial groove between each said two adjacent tongues for receiving said layer of damping material between each said two adjacent tongues;
   said tongues extending in an axial direction of the axis of said track wheel body; and
   at least one radial cut dividing said rings into several superposed plates which are formed from said tongues of the resonance absorber.

9. In the track wheel as claimed in claim 1, wherein said track wheel is solid, said wheel flange is provided with at least one radial cut, and one of said tongues of said resonance absorber being positioned on each side of said radial cut.

10. In the track wheel as claimed in claim 9, wherein said track wheel is solid, said wheel flange is provided with a plurality of surrounding grooves and the flange material surrounding said grooves and said radial cut form the tongues of said resonance absorber.

11. In a vibration absorber as claimed in claim 1, wherein
   said damping material is a mass which is free flowing before hardening,
   said mass when hardened being a plastic mass.

12. In a vibration absorber as claimed in claim 11, wherein
   said mass is silicon caoutchouc and has a high inner damping.

13. In the vibration absorber as claimed in claim 1, wherein said track wheel has different natural frequencies induced therein during use thereof, wherein:

said tongues extend in an axial and a radial direction of the axis of said track wheel body, the other end of each of said tongues being free to oscillate; and a radial groove between each said two adjacent radially extending tongues for receiving said layer of damping material between each said two adjacent tongues; and an axial groove in the rim of said track wheel between each said two adjacent axially extending tongues for receiving said layer of damping material between each said two adjacent axially extending tongues for receiving said layer of damping material between each said two adjacent tongues.

14. In the vibration absorber as claimed in claim 13, including radial cuts through said resonance absorber for dividing thereof into several superposed plates formed from said tongues.

15. In the track wheel as claimed in claim 1, wherein said tongues are rod-shaped, and said rod-shaped tongues vary in diameter from each other.

16. In the track wheel as claimed in claim 15, including:

a perforated block, said rods being welded to said perforated block.

17. In the track wheel as claimed in claim 15, including spacer elements between said rods, the innermost rod being a central rod section which forms a base, and means welding the ends of said rods together.

18. In the track wheel as claimed in claim 15, including:

a perforated block, said rods being inserted into said perforated block.

19. In a vibration absorber as claimed in claim 1, wherein said track wheel has at least two different natural frequencies, the improvement further comprising:

at least two of said at least one resonance absorber on said track wheel;

each said resonance absorber comprising a plurality of said adjacent tongues forming at least two pairs adjacent tongues and an individual layer of said intermediate layer of damping material being disposed between each said pair of said two adjacent tongues; and each said tongue being tuned to a different one of said natural frequencies of said wheel;

whereby the tuning of said tongues to the different natural frequencies provides for a resonance absorber for dampening the vibration of the wheel even though the vibrations are caused by different vibration inducers during the use thereof.

20. In a track wheel as claimed in claim 19, wherein said tongues are composed of aluminum.

21. In a vibration absorber as claimed in claim 1 or 19, wherein said at least one resonance absorber is on said wheel flange.

22. In a vibration absorber as claimed in claim 1 or 19, wherein said track wheel has a web and a rim, and said at least one resonance absorber is at the juncture of said web and said rim.

23. In the track wheel according to claim 1, including:

a base coupled to said wheel flange, and wherein said tongues are composed of plates of the same height and length and varying in width, said tongues being arranged in series on said base.

24. In the track wheel according to claim 1, wherein:

a base is coupled to said wheel flange, and said tongues are arranged in parallel on said base, said tongues all having the same height and length but varying in width.

25. In the track wheel according to claim 23 or 24, including a common base for each two adjacent sets of tongues.

26. In the track wheel according to claim 23 or 24, wherein said base comprises:

a plurality of said tongues, each said tongue being plate-like in shape, and said tongues being spaced from each other such that a space is formed between each pair of adjacent tongues;

distance plates to hold each said pair of adjacent tongues spaced from each other, positioned between each said pair of adjacent tongues;

a pair of cover plates positioned on each of the outermost tongues and covering said outermost tongues; and welding beads on said cover plates, said distance plates and said plurality of spaced tongues for welding said cover plates, said distance plates and said plurality of spaced tongues together, thereby forming a fixed base.

27. In the track wheel as claimed in claim 23 or 24, wherein said wheel flange is provided with an annular groove, said tongues being spaced from each other and arranged on the same base and being fixed to said wheel flange in said annular groove, and said damping material being inserted into said annular groove, in a flowable state so that it fills said annular groove and the space between said tongues to provide spacers after solidification.

28. In the track wheel as claimed in claim 23 or 24, wherein each side of said wheel flange is provided with annular grooves, said tongues are spaced from each other and fixed in said annular grooves.

29. In the track wheel as claimed in claim 23 or 24, wherein said wheel flange is provided with curved annular grooves, and said tongues are curved and have the same radius of curvature as said annular grooves.

30. In the track wheel as claimed in claim 23 or 24, including a wheel rim connected to said wheel flange, a wheel tire on said wheel rim, said wheel tire having annular grooves, and said resonance absorbers including said tongues and said damping material being connected with said annular grooves.

31. In the track wheel as claimed in claim 23 or 24, wherein a plurality of said tongues are arranged on the same base to form a block, said wheel body being provided with annular grooves peripherally arranged, and screws connecting said block to said wheel body in said annular grooves.

32. In the track wheel according to claim 23 or 24, wherein a plurality of said tongues are arranged on the same base to form a block, and said block is fixedly secured to said wheel body.

33. In the track wheel according to claim 32, wherein said wheel body is provided with recesses; and including rings shrunk into said recesses, and a screw connection connecting said blocks to said rings.

* * * * *